United States Patent
Wand

(10) Patent No.: US 10,071,635 B2
(45) Date of Patent: Sep. 11, 2018

(54) SYSTEM AND METHOD FOR VOLTAGE REGULATOR SHORT CIRCUIT PROTECTION

(71) Applicant: FORD GLOBAL TECHNOLOGIES, LLC, Dearborn, MI (US)

(72) Inventor: Thomas Joseph Wand, Canton, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 232 days.

(21) Appl. No.: 15/130,329

(22) Filed: Apr. 15, 2016

(65) Prior Publication Data

US 2017/0297435 A1   Oct. 19, 2017

(51) Int. Cl.
| | |
|---|---|
| *B60L 1/00* | (2006.01) |
| *B60L 11/02* | (2006.01) |
| *B60L 11/18* | (2006.01) |
| *H02M 3/04* | (2006.01) |

(52) U.S. Cl.
CPC ........... *B60L 11/02* (2013.01); *B60L 11/1816* (2013.01); *H02M 3/04* (2013.01)

(58) Field of Classification Search
CPC ........ B60L 11/02; B60L 11/1816; H02M 3/04
USPC .................. 307/9.1, 10.1; 327/538; 323/282
See application file for complete search history.

(56) References Cited

U.S. PATENT DOCUMENTS

2009/0237852 A1*   9/2009   Lin ........................ H02H 9/004
                                                                361/103

OTHER PUBLICATIONS

ON Semiconductor, "Micropower 70 mA Low Dropout Tracking Regulator/Line Driver", Publication Order Number: NCV8184/D, Oct. 2012—Rev. 27, http://onsemi.com, 20 pgs., Semiconductor Components Industries, LLC, 2012.

* cited by examiner

*Primary Examiner* — Thomas Skibinski
(74) *Attorney, Agent, or Firm* — David Kelley; Brooks Kushman P.C.

(57) ABSTRACT

A controller includes a tracking regulator having a reference voltage input and a voltage output and configured to regulate the voltage output to the reference voltage input. The controller is configured to, in response to a short to ground of the voltage output, electrically couple the reference voltage input to the voltage output.

18 Claims, 4 Drawing Sheets

SYSTEM AND METHOD FOR VOLTAGE REGULATOR SHORT CIRCUIT PROTECTION

TECHNICAL FIELD

This application generally relates to a circuit for protecting integrated circuit voltage regulator from short circuits.

BACKGROUND

Vehicle controllers interface with a variety of sensing devices. In some instances, a voltage output is provided to the sensing devices. In most cases, the sensing devices are located remotely from the vehicle controller. A length of wiring may extend between the sensing device and the vehicle controller. Further, the wires are coupled to the vehicle controller and sensing device by connectors. These connectors and wiring are subject to temperature, vibration, and environmental conditions. As a result, conductive elements of the wiring and connectors may become electrically coupled to unintended sources or destinations.

SUMMARY

A controller for a vehicle includes a tracking regulator having a voltage input, a reference voltage input, a voltage output, and a switch electrically coupled between the voltage input and the voltage output. The controller also includes a circuit including a second switch electrically coupled between the reference voltage input and the voltage output, and configured to close the second switch in response to a short to ground of the voltage output.

A vehicle includes a sensor having a voltage input. The vehicle also includes a controller including a first switch electrically coupled between the voltage input and a supply voltage and controlled based on a voltage difference between a reference voltage and the voltage input, and a second switch electrically coupled between the reference voltage and the voltage input and controlled to close in response to a short to ground of the voltage input.

A method of controlling a tracking regulator in a controller includes operating a first switch to electrically couple a voltage input of the tracking regulator to a voltage output of the tracking regulator based on a reference voltage input of the tracking regulator. The method also includes closing a second switch to form a low-impedance path between the reference voltage input and the voltage output in response to a short to ground of the voltage output.

DETAILED DESCRIPTION

Embodiments of the present disclosure are described herein. It is to be understood, however, that the disclosed embodiments are merely examples and other embodiments can take various and alternative forms. The figures are not necessarily to scale; some features could be exaggerated or minimized to show details of particular components. Therefore, specific structural and functional details disclosed herein are not to be interpreted as limiting, but merely as a representative basis for teaching one skilled in the art to variously employ the present invention. As those of ordinary skill in the art will understand, various features illustrated and described with reference to any one of the figures can be combined with features illustrated in one or more other figures to produce embodiments that are not explicitly illustrated or described. The combinations of features illustrated provide representative embodiments for typical applications. Various combinations and modifications of the features consistent with the teachings of this disclosure, however, could be desired for particular applications or implementations.

Figure 1:
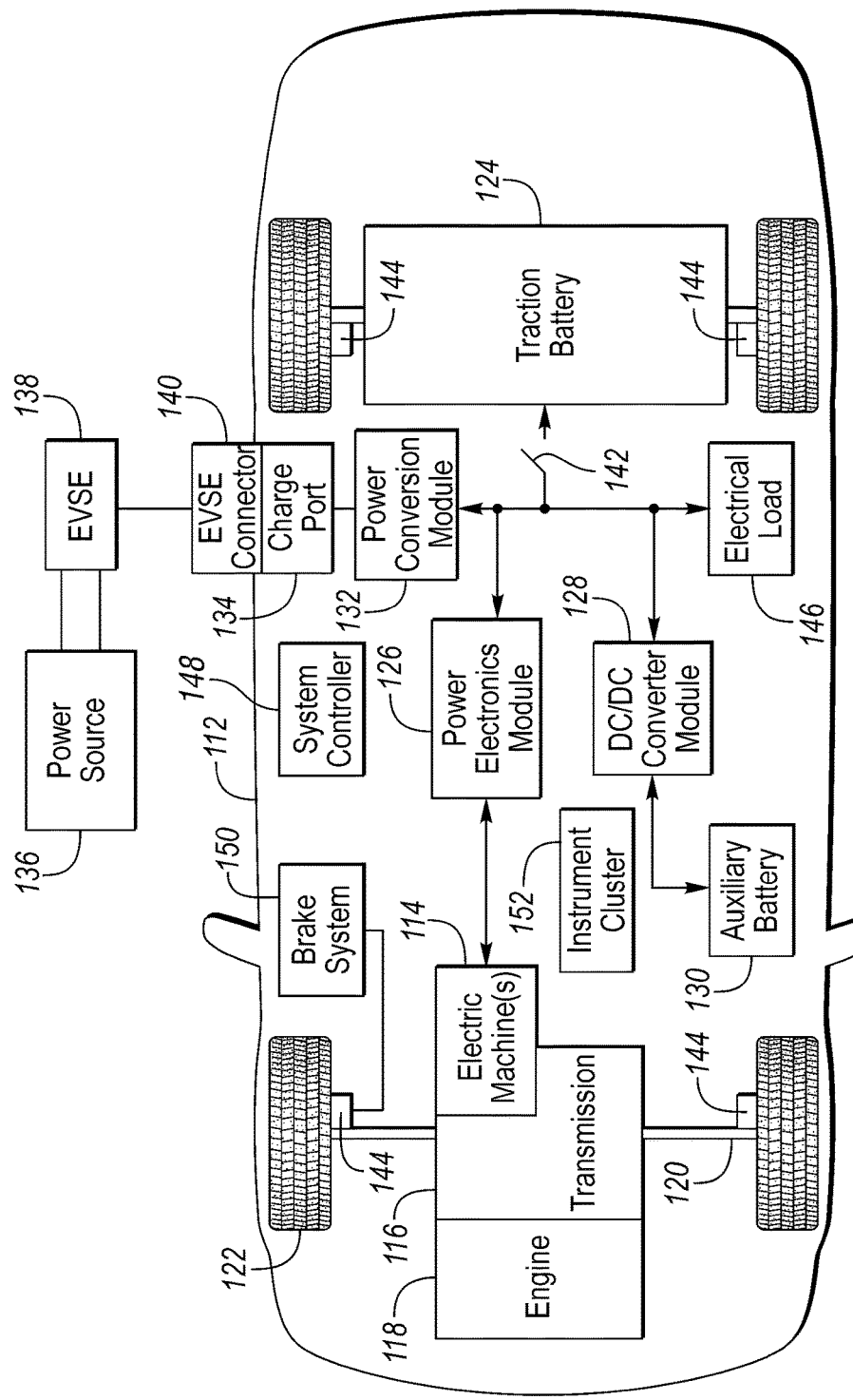
FIG. 1 is a diagram of a hybrid vehicle illustrating typical drivetrain and energy storage components.

FIG. 1 depicts a typical plug-in hybrid-electric vehicle (PHEV). A typical plug-in hybrid-electric vehicle 112 may comprise one or more electric machines 114 mechanically coupled to a hybrid transmission 116. The electric machines 114 may be capable of operating as a motor or a generator. In addition, the hybrid transmission 116 is mechanically coupled to an engine 118. The hybrid transmission 116 is also mechanically coupled to a drive shaft 120 that is mechanically coupled to the wheels 122. The electric machines 114 can provide propulsion and deceleration capability when the engine 118 is turned on or off. The electric machines 114 also act as generators and can provide fuel economy benefits by recovering energy that would normally be lost as heat in a friction braking system. The electric machines 114 may also reduce vehicle emissions by allowing the engine 118 to operate at more efficient speeds and allowing the hybrid-electric vehicle 112 to be operated in electric mode with the engine 118 off under certain conditions.

A traction battery or battery pack 124 stores energy that can be used by the electric machines 114. A vehicle battery pack 124 typically provides a high voltage direct current (DC) output. The traction battery 124 may be electrically coupled to one or more power electronics modules. One or more contactors 142 may isolate the traction battery 124 from other components when opened and connect the traction battery 124 to other components when closed. The power electronics module 126 may also be electrically coupled to the electric machines 114 and provides the ability to bi-directionally transfer energy between the traction battery 124 and the electric machines 114. For example, a traction battery 124 may provide a DC voltage while the electric machines 114 may operate with a three-phase alternating current (AC) to function. The power electronics module 126 may convert the DC voltage to a three-phase AC current to operate the electric machines 114. In a regenerative mode, the power electronics module 126 may convert the three-phase AC current from the electric machines 114 acting as generators to the DC voltage compatible with the traction battery 124. The description herein is equally applicable to a pure electric vehicle. For a pure electric vehicle, the hybrid transmission 116 may be a gear box connected to an electric machine 114 and the engine 118 may not be present.

In addition to providing energy for propulsion, the traction battery 124 may provide energy for other vehicle electrical systems. A vehicle 112 may include a DC/DC converter module 128 that converts the high voltage DC output of the traction battery 124 to a low voltage DC supply that is compatible with low-voltage vehicle loads. An output of the DC/DC converter module 128 may be electrically coupled to an auxiliary battery 130 (e.g., 12V battery). The low-voltage systems may be electrically coupled to the auxiliary battery. Other high-voltage loads 146, such as compressors and electric heaters, may be coupled to the high-voltage output of the traction battery 124. The electrical loads 146 may have an associated controller that operates and controls the electrical loads 146 when appropriate.

The vehicle 112 may be an electric vehicle or a plug-in hybrid vehicle in which the traction battery 124 may be recharged by an external power source 136. The external power source 136 may be a connection to an electrical outlet. The external power source 136 may be electrically coupled to a charger or electric vehicle supply equipment (EVSE) 138. The external power source 136 may be an electrical power distribution network or grid as provided by an electric utility company. The EVSE 138 may provide circuitry and controls to regulate and manage the transfer of energy between the power source 136 and the vehicle 112. The external power source 136 may provide DC or AC electric power to the EVSE 138. The EVSE 138 may have a charge connector 140 for plugging into a charge port 134 of the vehicle 112. The charge port 134 may be any type of port configured to transfer power from the EVSE 138 to the vehicle 112. The charge port 134 may be electrically coupled to a charger or on-board power conversion module 132. The power conversion module 132 may condition the power supplied from the EVSE 138 to provide the proper voltage and current levels to the traction battery 124. The power conversion module 132 may interface with the EVSE 138 to coordinate the delivery of power to the vehicle 112. The EVSE connector 140 may have pins that mate with corresponding recesses of the charge port 134. Alternatively, various components described as being electrically coupled or connected may transfer power using a wireless inductive coupling.

One or more wheel brakes 144 may be provided for decelerating the vehicle 112 and preventing motion of the vehicle 112. The wheel brakes 144 may be hydraulically actuated, electrically actuated, or some combination thereof. The wheel brakes 144 may be a part of a brake system 150. The brake system 150 may include other components to operate the wheel brakes 144. For simplicity, the figure depicts a single connection between the brake system 150 and one of the wheel brakes 144. A connection between the brake system 150 and the other wheel brakes 144 is implied. The brake system connections may be hydraulic and/or electrical. The brake system 150 may include a controller to monitor and coordinate operation of the wheel brakes 144. The brake system 150 may monitor the brake components and control the wheel brakes 144 for vehicle deceleration. The brake system 150 may respond to driver commands and may also operate autonomously to implement features such as stability control. The controller of the brake system 150 may implement a method of applying a requested brake force when requested by another controller or sub-function.

Electronic modules in the vehicle 112 may communicate via one or more vehicle networks. The vehicle network may include a plurality of channels for communication. One channel of the vehicle network may be a serial bus such as a Controller Area Network (CAN). One of the channels of the vehicle network may include an Ethernet network defined by Institute of Electrical and Electronics Engineers (IEEE) 802 family of standards. Additional channels of the vehicle network may include discrete connections between modules and may include power signals from the auxiliary battery 130. Different signals may be transferred over different channels of the vehicle network. For example, video signals may be transferred over a high-speed channel (e.g., Ethernet) while control signals may be transferred over CAN or discrete signals. The vehicle network may include any hardware and software components that aid in transferring signals and data between modules. The vehicle network is not shown in FIG. 1 but it may be implied that the vehicle network may connect to any electronic module that is present in the vehicle 112. A vehicle system controller (VSC) 148 may be present to coordinate the operation of the various components.

Figure 2:
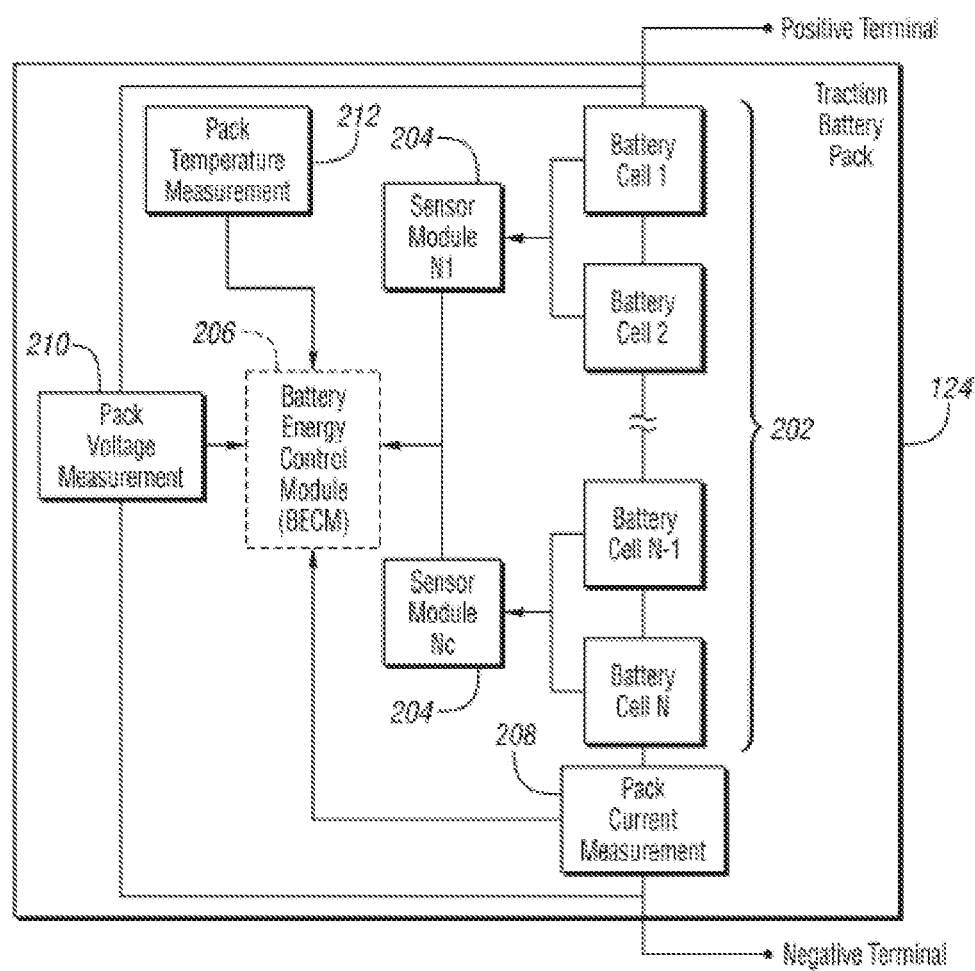
FIG. 2 is a diagram of a possible battery pack arrangement comprised of multiple cells, and monitored and controlled by a Battery Energy Control Module.

A traction battery 124 may be constructed from a variety of chemical formulations. Typical battery pack chemistries may be lead acid, nickel-metal hydride (NIMH) or Lithium-Ion. FIG. 2 shows a typical traction battery pack 124 in a simple series configuration of N battery cells 202. Other battery packs 124, however, may be composed of any number of individual battery cells connected in series or parallel or some combination thereof. A battery management system may have one or more controllers, such as a Battery Energy Control Module (BECM) 206, that monitor and control the performance of the traction battery 124. The battery pack 124 may include sensors to measure various pack level characteristics. The battery pack 124 may include one or more pack current measurement sensors 208, pack voltage measurement sensors 210, and pack temperature measurement sensors 212. The BECM 206 may include circuitry to interface with the pack current sensors 208, the pack voltage sensors 210 and the pack temperature sensors 212. The BECM 206 may have non-volatile memory such that data may be retained when the BECM 206 is in an off condition. Retained data may be available upon the next key cycle.

In addition to the pack level characteristics, there may be battery cell 202 level characteristics that are measured and monitored. For example, the terminal voltage, current, and temperature of each cell 202 may be measured. A system may use one or more sensor modules 204 to measure the battery cell 202 characteristics. Depending on the capabilities, the sensor modules 204 may measure the characteristics of one or multiple of the battery cells 202. The battery pack 124 may utilize up to $N_c$ sensor modules 204 to measure the characteristics of all the battery cells 202. Each of the sensor modules 204 may transfer the measurements to the BECM 206 for further processing and coordination. The sensor modules 204 may transfer signals in analog or digital form to the BECM 206. In some configurations, the functionality of the sensor modules 204 may be incorporated internally to the BECM 206. That is, the hardware of the sensor modules 204 may be integrated as part of the circuitry in the BECM 206 and the BECM 206 may handle the processing of raw signals. The BECM 206 may also include circuitry to interface with the one or more contactors 142 to open and close the contactors 142.

The BECM 206 may include circuitry to interface with the current measurement sensors 208. The BECM may include one or more analog-to-digital (A/D) converters that are configured to convert an analog voltage input to a digital value for processing. In order to function, the A/D converters are supplied a reference voltage. The A/D converter converts the input voltages to a digital value that is based on the reference voltage. For example, an input voltage that is greater than or equal to the reference value will result in a maximum digital value. An input voltage of zero will result in a minimum digital value of zero. Input voltages that are between the reference voltage and ground reference result in a digital value that is based on a ratio of the input voltage to the reference voltage.

Some sensors may require a voltage reference signal to operate properly. For example, the current measurement sensors 208 may require a voltage reference that is supplied by the BECM 206. In applications in which the voltage reference signal is routed outside of the controller, a tracking regulator may be used. An example of one such tracking regulator is a NCV8184PDR produced by ON Semiconductor. In other configurations, the tracking regulator may be constructed of discrete components. The tracking regulator provides a voltage output that closely tracks a reference voltage input. An additional function of the tracking regulator is to buffer the voltage so that conditions on the output do not affect the voltage input. The result is that the on-controller power supply is not affected by conditions present at the tracking regulator voltage output. The tracking regulator is typically an integrated circuit (IC). The tracking regulator may include a current limiting function that limits the amount of current flowing to the output.

Under some conditions the tracking regulator voltage output may not track the voltage input. For example, a short to ground condition on the tracking regulator voltage output may cause the input and output voltages to differ. Further, the short to ground condition may cause a relatively large current draw within the tracking regulator. Although the current may be limited and the voltage input may remain unaffected, the current draw must be dissipated by the tracking regulator. A prolonged short to ground condition may cause an over-temperature condition of the tracking regulator. The tracking regulator may include thermal shutdown capability, but a prolonged short circuit condition may lead to oscillations in which the tracking regulator voltage output is enabled and disabled as the temperature fluctuates with the on/off cycling.

Figure 3:
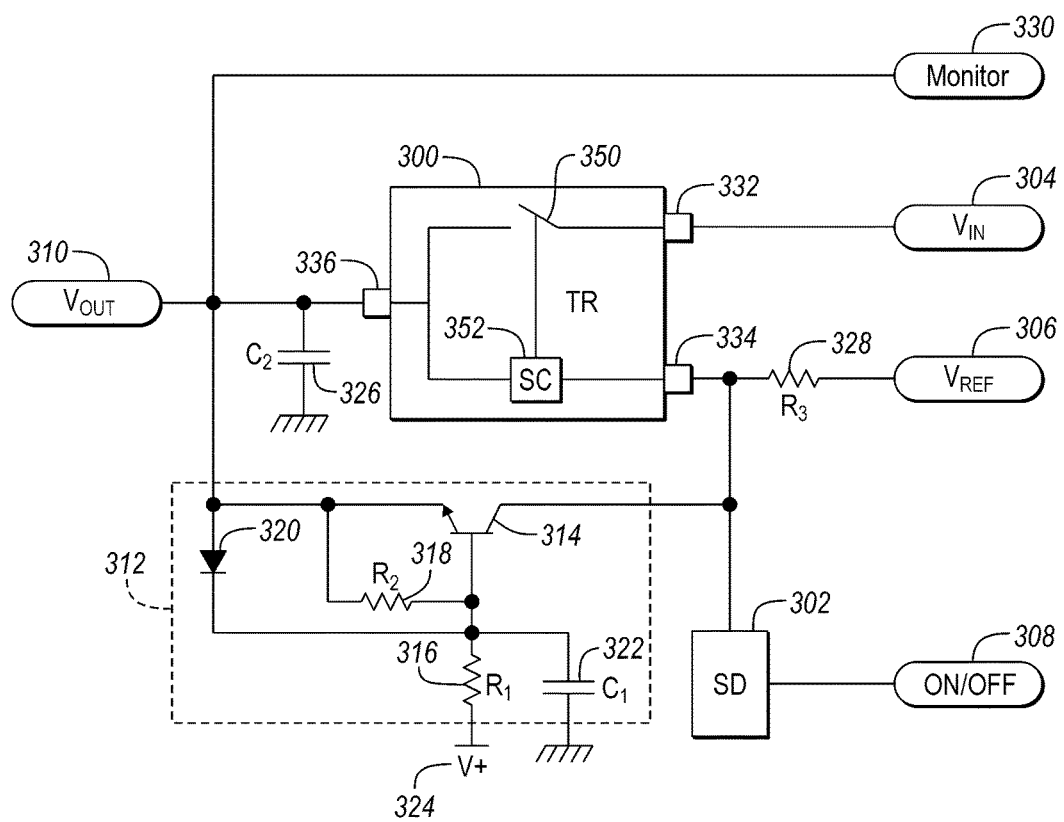
FIG. 3 is a diagram of a short-circuit protection circuit configured to prevent thermal overload of a tracking regulator in a controller.

FIG. 3 depicts a possible circuit arrangement for improving the short circuit response to a tracking regulator 300. The tracking regulator 300 may have an input voltage port 332 for receiving a supply or input voltage 304 and a reference voltage input port 334 for receiving a reference voltage 306. The tracking regulator 300 may have a voltage output port 336 for providing a regulated voltage output 310. The regulated voltage output 310 may be supplied to other devices (e.g., current measurement sensor 208). The term port may be used with reference to an IC type tracking regulator, but is intended to identify inputs and outputs to the tracking regulator circuit or function regardless of configuration.

The tracking regulator 300 may operate by regulating the input voltage 304 applied to the input voltage port 332 to achieve the level of the reference voltage 306 applied to the reference voltage input port 334. The tracking regulator includes a switch and/or switching element 350 that is electrically coupled between the input voltage port 332 and the voltage output port 336. The switching element 350 is generally configured such that when closed a low-impedance path is formed between two connection points of the switching element 350. The switching element 350 may be a solid-state transistor device (e.g., bi-polar transistor (BPT), complementary metal-oxide semiconductor (CMOS) transistor) and may be part of an IC. The input voltage 304 may have a magnitude that is greater than the reference voltage 306. The voltage at the voltage output 336 may be controlled by a switching control circuit 352. The switching control circuit 352 may control the opening and closing of the switching element 350 based on a difference between the voltage at the voltage output port 336 and the voltage at the reference voltage input port 334. The switching control circuit 352 is configured such that the reference voltage input port 334 is separated from the voltage input port 332 and the voltage output port 336 by a high impedance. A reference control resistor 328 may be in the circuit between the reference voltage 306 and the reference voltage input port 334. The reference control resistor 328 may allow the voltage at the reference voltage input port 334 to differ from the reference voltage 306 and limit current sourced by the reference voltage 306 when short-circuit protection is active.

The switching element 350 selectively couples the input voltage 304 to the tracking regulator voltage output 310. The reference voltage 306 applied to the reference voltage input port 334 may be used in the switching control circuitry 352 within the tracking regulator 300 to control operation of the switching element 350 to maintain the tracking regulator voltage output 310 at the level of the reference voltage 306. When the reference voltage 306 is above a predetermined voltage, the tracking regulator voltage output 310 is enabled. Below the predetermined voltage, the tracking regulator voltage output 310 may be disabled. That is, the voltage input 304 is decoupled from the tracking regulator voltage output 310 (e.g., switching element 350 in a non-conducting state or open state). A smoothing capacitor 326 may be electrically coupled between the output port 336 and a ground reference. The smoothing capacitor 326 may function to filter the switched voltage signal at the output port 336.

An on/off control signal 308 may be applied to enable and disable the tracking regulator 300. Shutdown circuitry 302 may be present to cause the voltage at the reference voltage input port 334 to be zero in response to the on/off control signal 308. The on/off control signal 308 may be an output of a microprocessor and allows the tracking regulator 300 to be activated and deactivated according to program control.

A monitor signal 330 may be electrically coupled to the voltage output port 336 to provide feedback to a microprocessor. The controller may include circuitry to filter and scale the monitor signal 330. The microprocessor of the controller may be programmed to input the monitor signal 330 and utilize the value for diagnostic functions.

To improve the short circuit capability of a controller (e.g., BECM 206) that includes such a tracking regulator 300, it may be desirable to detect a shorted voltage output of the tracking regulator 300 and modify the signal at the reference voltage input port 334 in response. When a short to ground of the tracking regulator voltage output port 336 is detected, the tracking regulator 300 may be effectively turned off to prevent overheating. By reducing the voltage at the reference voltage input port 334, the voltage at the voltage output port 336 is reduced by operation of the tracking regulator 300 which reduces the current flowing through the tracking regulator 300.

A short-circuit protection circuit 312 may be implemented to protect the tracking regulator 300 during short-circuit conditions. The short-circuit protection circuit 312 may be configured as discrete components. the short-circuit protection circuit 312 may also be incorporated into the tracking regulator 300 as part of the same IC. The short-circuit protection circuit 312 may include a switching device 314 that is electrically coupled between the voltage output port 336 of the tracking regulator 300 and the reference voltage input port 334 of the tracking regulator 300. The switching device 314 as shown in the example of FIG. 3 is an NPN transistor. However, the switching device 314 could be any type of solid-state switching device such as a field-effect transistor (FET) or a PNP transistor. The general principle of operation remains the same regardless of the type of switching device 314 used. In response to a short to ground at the voltage output port, the switching device 314 may be controlled to electrically couple the reference voltage input port 334 to the voltage output port 336. By coupling the reference voltage input port 334 to the shorted to ground voltage output port 336, the tracking regulator is effectively turned off as the reference voltage goes to zero.

Operation of the circuit can be explained with reference to an NPN transistor as the switching device 314. An emitter of the NPN transistor 314 may be electrically coupled to the voltage output port 336 of the tracking regulator 300. A collector of the NPN transistor 314 may be electrically connected to the reference voltage input port 334 of the tracking regulator 300. A resistive voltage divider network consisting of a first resistor 316 and a second resistor 318 may be coupled between a voltage source 324 and the voltage output port 336. A base of the NPN transistor 314 may be coupled to a voltage source 324 through the first resistor 316. The voltage source 324 may be a voltage level that is approximately equal to the reference voltage 306. In some configurations, the voltage source 324 may have a magnitude or voltage level that is greater than the reference voltage 306. The base of the NPN transistor 314 may also be electrically coupled to the voltage output port 336 through the second resistor 318. The voltage divider network may provide a bias voltage to the NPN transistor 314 based on a voltage difference between the voltage source 324 and the voltage output port 336.

The controller may be configured to protect the NPN transistor 314 from reverse overvoltage emitter-to-base stresses during certain conditions. The controller may be configured to prevent the switching device 314 from conducting during an overvoltage condition at the voltage output port 336. An overvoltage condition may be present when the voltage at the voltage output port 336 is greater than the reference voltage 306. The base of the NPN transistor 314 may be electrically coupled to the output port 336 through a diode 320. The diode 320 may be included to provide protection for the NPN transistor 314 when the output port 336 is shorted to battery or other supplied voltage. This configuration prevents a reverse base-to-emitter voltage from exceeding a maximum reverse voltage withstand capability of the NPN transistor 314 (e.g., approximately 5 Volts). In an overvoltage condition at the voltage output port 336, the diode 320 conducts in a forward direction and limits the base-emitter reverse voltage to the voltage drop of a conducting diode (approximately 0.7 Volts).

The controller may be further configured to ensure that the switching device 314 is not activated for a predetermined time immediately following controller power up. In the example configuration, the base of the NPN transistor 314 may be further coupled to a ground reference through a start-up capacitor 322. The start-up capacitor 322 prevents the NPN transistor 314 from being turned on immediately at power-up by slowing the rise time of the voltage at the base of the NPN transistor 314. A time constant defined by the start-up capacitor 322 and the first resistor 316 may be selected to be greater than the startup time of the tracking regulator 300.

Figure 4:
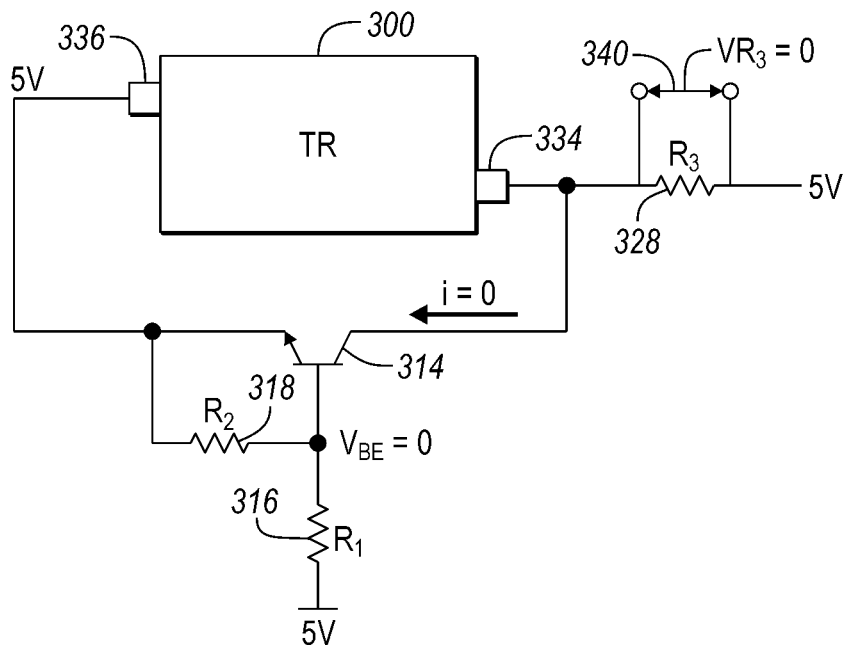
FIG. 4 is a diagram depicting normal operating conditions for the short-circuit protection circuit.

FIG. 4 depicts a normal operating condition with no shorted output port 336. For example, a voltage of 5 Volts is selected as the reference voltage 306. The tracking regulator 300 operates to provide 5 Volts at the output port 336. Further, the voltage of the voltage source 324 is selected to be at a voltage level of 5 Volts. In this state, a base-to-emitter voltage is zero. This is observed since the voltage at the emitter of the NPN transistor 314 is 5 Volts and the voltage at the base is 5 Volts. In this condition, there is no current flowing in the first resistor 316 or the second resistor 318. Since base-to-emitter voltage is zero, the NPN transistor 314 is in an off or non-conducting state. That is, current will not flow between the collector and emitter. The current flowing between the collector and emitter is zero. The reference control resistor voltage drop 340 (e.g., voltage drop across the reference control resistor 328) is approximately zero since no current flows through the short-circuit protection circuit 312 in this condition. Note that an impedance value within the tracking regulator 300 associated with the reference voltage input port 334 is a large value to minimize current draw.

Figure 5:
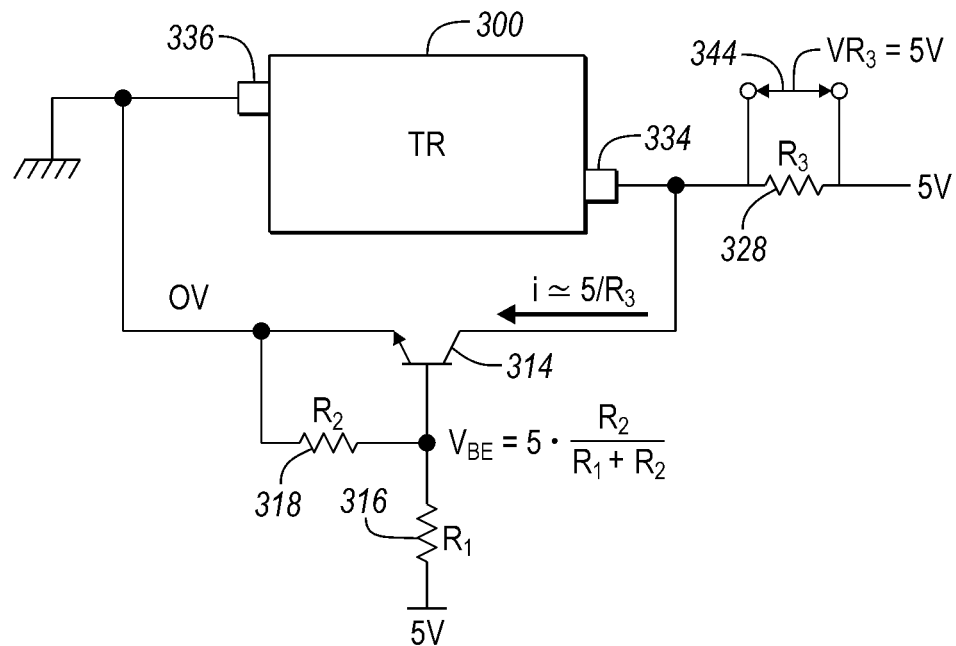
FIG. 5 is a diagram depicting operating conditions during a short to ground condition for the short-circuit protection circuit.

FIG. 5 depicts a condition in which the output port 336 is shorted to ground. The same voltage selections are made as in FIG. 4. The exception however, is that the voltage at the output port 336 is zero since it is shorted to ground. In this case, the tracking regulator 300 may be in a current limiting mode. In this condition, the base-to-emitter voltage is defined by the voltage source 324 and the voltage divider formed by the first resistor 316 and the second resistor 318. The base-to-emitter voltage in this case may be a product of 5V and $R_2/(R_2+R_1)$. The first resistor 316 and the second resistor 318 may be selected so that in the shorted condition the base-to-emitter voltage is sufficient to place the NPN transistor 314 in a conducting state. That is, current may flow between the collector and emitter. In this state, current will flow through the NPN transistor 314. The current flow may be defined by the reference voltage and the reference control resistor 328 (e.g., $i=5/R_3$). The reference control resistor voltage drop 344 in this case is approximately 5 Volts. The voltage at the reference voltage input port 334 is approximately zero. In this case, a short at the output port 336 effectively turns off the tracking regulator 300 by adjusting the voltage at the reference voltage input port 334.

Note that different voltage values may be used. The short-circuit protection circuitry 312 can also prevent problems when shorted to voltages different than ground. A similar analysis may be conducted. The current flow through the NPN transistor 314 may depend upon the voltage difference between the reference voltage 306 and the shorted voltage value.

In some configurations, once a short-circuit condition occurs and the reference voltage input port 334 is coupled to the voltage output port 336, the condition may be latched. For example, a latching circuit may be included to hold the reference voltage input port 334 to ground in response to activation of the short-circuit protection. The latching circuit may prevent the voltage at voltage output port 336 from toggling between high and low values due to an intermittent short to ground condition.

Note that although the example presented as a battery controller (e.g., BECM 206) application in a hybrid vehicle, the short-circuit protection circuitry presented is applicable any type of vehicle with any controller that utilizes a tracking regulator. For example, the short-circuit protection circuitry can be used in powertrain controllers, body controllers, heating/ventilation/air-conditioning (HVAC) controllers, and brake system controllers.

The processes, methods, or algorithms disclosed herein can be deliverable to/implemented by a processing device, controller, or computer, which can include any existing programmable electronic control unit or dedicated electronic control unit. Similarly, the processes, methods, or algorithms can be stored as data and instructions executable by a controller or computer in many forms including, but not limited to, information permanently stored on non-writable storage media such as ROM devices and information alterably stored on writeable storage media such as floppy disks, magnetic tapes, CDs, RAM devices, and other magnetic and optical media. The processes, methods, or algorithms can also be implemented in a software executable object. Alternatively, the processes, methods, or algorithms can be embodied in whole or in part using suitable hardware components, such as Application Specific Integrated Circuits (ASICs), Field-Programmable Gate Arrays (FPGAs), state machines, controllers or other hardware components or devices, or a combination of hardware, software and firmware components.

While exemplary embodiments are described above, it is not intended that these embodiments describe all possible forms encompassed by the claims. The words used in the specification are words of description rather than limitation, and it is understood that various changes can be made without departing from the spirit and scope of the disclosure. As previously described, the features of various embodiments can be combined to form further embodiments of the invention that may not be explicitly described or illustrated. While various embodiments could have been described as providing advantages or being preferred over other embodiments or prior art implementations with respect to one or more desired characteristics, those of ordinary skill in the art recognize that one or more features or characteristics can be compromised to achieve desired overall system attributes, which depend on the specific application and implementation. These attributes may include, but are not limited to cost, strength, durability, life cycle cost, marketability, appearance, packaging, size, serviceability, weight, manufacturability, ease of assembly, etc. As such, embodiments described as less desirable than other embodiments or prior art implementations with respect to one or more characteristics are not outside the scope of the disclosure and can be desirable for particular applications.

What is claimed is:

1. A controller for a vehicle comprising:
    a tracking regulator having a voltage input, a reference voltage input, a voltage output, and a switch electrically coupled between the voltage input and the voltage output; and
    a circuit including a second switch configured to form a low-impedance path between the reference voltage input and the voltage output when closed, and configured to close the second switch responsive to a short to ground of the voltage output.

2. The controller of claim 1 wherein the second switch is an NPN transistor having a base, an emitter and a collector.

3. The controller of claim 2 wherein the circuit includes a first resistor electrically coupled between the voltage output and the base and a second resistor electrically coupled between the base and a voltage source.

4. The controller of claim 3 wherein a voltage provided by the voltage source is greater than or equal to the reference voltage input.

5. The controller of claim 2 wherein the circuit includes a capacitor electrically coupled between the base and a ground reference.

6. The controller of claim 2 wherein the circuit includes a diode electrically coupled between the voltage output and the base.

7. A vehicle comprising:
    a sensor having a voltage input; and
    a controller including a first switch electrically coupled between a voltage output coupled to the voltage input and a supply voltage and controlled based on a voltage difference between a reference voltage and the voltage output, and a second switch electrically coupled between the reference voltage and the voltage output and controlled to close in responsive to a short to ground of the voltage input.

8. The vehicle of claim 7 wherein the second switch is configured to, when closed, form a low-impedance path between the reference voltage and the voltage output.

9. The vehicle of claim 7 wherein the controller is further configured to prevent the second switch from closing for a predetermined time immediately following controller power up.

10. The vehicle of claim 7 wherein the first switch is part of a tracking regulator integrated circuit.

11. The vehicle of claim 7 wherein the second switch is an NPN transistor having a base, an emitter electrically coupled to the voltage input, and a collector electrically coupled to the reference voltage.

12. The vehicle of claim 11 wherein the controller includes a resistive voltage divider network electrically coupled between a voltage source and the voltage output and electrically coupled to the base to provide a bias voltage for the NPN transistor that is based on a voltage between the voltage source and the voltage output.

13. The vehicle of claim 12 wherein a voltage magnitude of the voltage source is greater or equal to that of the reference voltage.

14. The vehicle of claim 11 wherein the controller includes a capacitor electrically coupled between the base and a ground reference to prevent the NPN transistor from conducting for a predetermined time immediately following controller power up.

15. The vehicle of claim 11 wherein the controller includes a diode electrically coupled between the voltage output and the base and configured to limit a reverse base-to-emitter voltage from exceeding a predetermined voltage.

16. A method of controlling a tracking regulator in a controller comprising:
    operating a first switch to electrically couple a voltage input of the tracking regulator to a voltage output of the tracking regulator based on a reference voltage input of the tracking regulator; and
    closing a second switch to form a low-impedance path between the reference voltage input and the voltage output in response to a short to ground of the voltage output.

17. The method of claim 16 further comprising inhibiting closing the second switch for a predetermined time immediately following power up of the controller.

18. The method of claim 16 further comprising operating the first switch based on a difference between the reference voltage input and the voltage output.

* * * * *